(No Model.)
J. K. PATTERSON.
STALK CUTTER.
No. 320,812. Patented June 23, 1885.
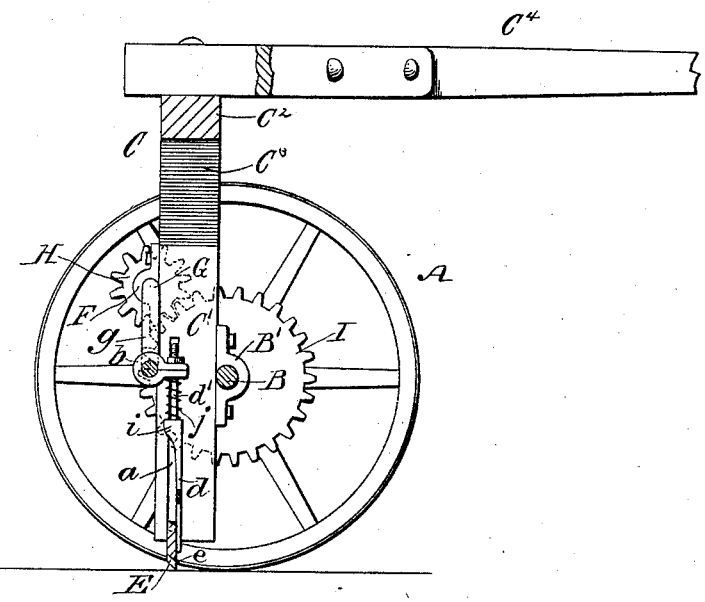
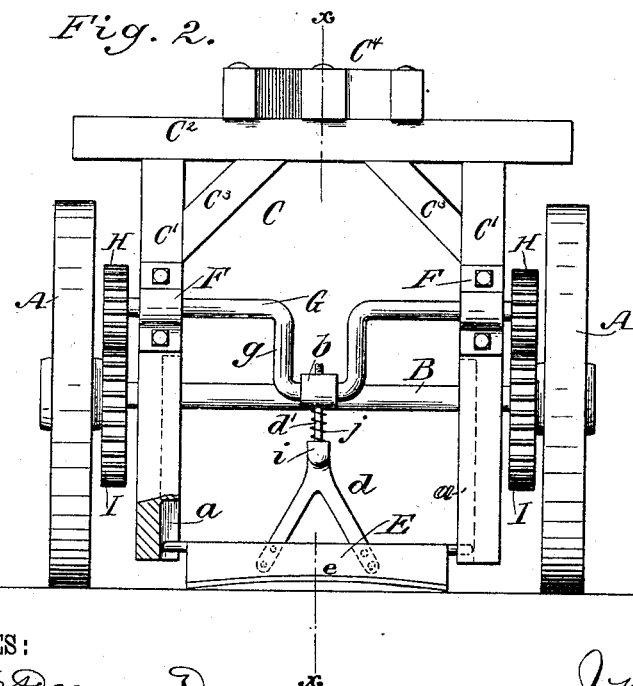
WITNESSES:
INVENTOR:
J. K. Patterson
BY Munn & Co.
ATTORNEYS.

UNITED STATES PATENT OFFICE.

JAMES K. PATTERSON, OF CRETE, NEBRASKA.

STALK-CUTTER.

SPECIFICATION forming part of Letters Patent No. 320,812, dated June 23, 1885.

Application filed July 9, 1884. (No model.)

*To all whom it may concern:*

Be it known that I, JAMES K. PATTERSON, of Crete, in the county of Saline and State of Nebraska, have invented a new and Improved Stalk-Cutter, of which the following is a full, clear, and exact description.

This invention relates to certain improvements in stalk-cutters; and it consists in the construction and arrangement of parts, as will be hereinafter fully described and claimed.

Reference is to be had to the accompanying drawings, forming part of this specification, in which similar letters of reference indicate corresponding parts in both the figures.

Figure 1 is a sectional elevation of my new and improved stalk-cutter, taken on the line $x\ x$ of Fig. 2; and Fig. 2 is a broken rear elevation of the machine.

A A are the two drive-wheels of the machine, secured to the axle B, to which latter the main frame C is secured by the journal-blocks B' B' of the axle, bolted to the upright pieces C' C' of the frame. In this instance the main frame C is composed of the said upright pieces C' C', the lower ends of which are carried near the ground, the upper cross-piece, C², braces C³ C³, and the tongue C⁴, secured to the said cross-piece C². The uprights C' C', below the axle B, are correspondingly grooved upon their inner edges, as shown at $a\ a$, to form guiding-ways for guiding the movement of the knife E, and to the outer edges of the uprights C' are bolted the journal-blocks F F, in which is journaled the crank-shaft G, to the crank $g$ of which the knife E is attached by the wrist-piece $b$ and bifurcated connecting-rod $d$.

To the ends of the crank-shaft G are secured the pinions H H, which mesh with the cog-wheels I I, secured upon shaft B, so that as the machine is drawn along the ground the revolution of the drive-wheels A A and the main axle B will cause the crank-shaft G to revolve, which will reciprocate vertically the knife E, and cause it to cut the stalks upon the ground.

The cutting-edge of the knife E is, by preference, slightly curved, as shown at $e$, to render it more effective in cutting the stalks; and upon the reduced portion $d'$ of the connecting-rod $d$ is placed the coiled spring $j$, which acts between the said wrist-piece $b$ and the shoulder $i$ of the rod, to cushion the downstroke of the crank $g$, so that in case the knife should strike a stone or other solid object the spring will yield and prevent all injury to the machine.

Constructed in the manner described it will be seen that the machine will be very effective in its action, as it cuts with a reciprocating action, so that it cannot become clogged, and it will be seen also that the machine is strong, durable, and cheap, and easy to handle, having simply to be drawn along the ground by a team hitched to the tongue C⁴.

Having thus described my invention, what I claim as new, and desire to secure by Letters Patent, is—

The stalk-cutter herein shown and described, consisting of the frame C, drive-wheels A, axle B, crank-shaft G, cog-wheels H I, and knife E, connected to the crank by the rod $d$ and wrist-piece $b$, the knife being guided in the grooves $a$ of the uprights C', and provided with the spring $j$, substantially as and for the purposes set forth.

JAMES K. PATTERSON.

Witnesses:
   H. M. WELLS,
   GEORGE H. HASTINGS.